(12) United States Patent
Glade et al.

(10) Patent No.: US 8,332,613 B1
(45) Date of Patent: Dec. 11, 2012

(54) METHODS AND SYSTEMS FOR MANAGING I/O REQUESTS TO MINIMIZE DISRUPTION REQUIRED FOR DATA ENCAPSULATION AND DE-ENCAPSULATION

(75) Inventors: Bradford B. Glade, Harvard, MA (US); Helen S. Raizen, Jamaica Plain, MA (US); Matthew D. Waxman, Waltham, MA (US); David W. Harvey, Newton, MA (US); Michael E. Bappe, Loveland, CO (US)

(73) Assignee: EMC Corporation, Hopkinton, MA (US)

( * ) Notice: Subject to any disclaimer, the term of this patent is extended or adjusted under 35 U.S.C. 154(b) by 1126 days.

(21) Appl. No.: 11/863,745

(22) Filed: Sep. 28, 2007

Related U.S. Application Data

(63) Continuation-in-part of application No. 11/536,995, filed on Sep. 29, 2006, now Pat. No. 7,809,912.

(51) Int. Cl.
*G06F 12/08* (2006.01)
(52) U.S. Cl. .................. 711/203; 711/152; 711/E12.001
(58) Field of Classification Search .................. 711/152, 711/203, E12.001
See application file for complete search history.

(56) References Cited

U.S. PATENT DOCUMENTS

| | | | |
|---|---|---|---|
| 5,742,792 A | 4/1998 | Yanai et al. | |
| 6,564,336 B1 | 5/2003 | Majkowski | |
| 6,745,306 B1 * | 6/2004 | Willman et al. | 711/163 |
| 6,845,403 B2 * | 1/2005 | Chadalapaka | 710/5 |
| 6,857,059 B2 * | 2/2005 | Karpoff et al. | 711/209 |
| 7,076,690 B1 | 7/2006 | Todd et al. | |
| 7,080,221 B1 | 7/2006 | Todd et al. | |
| 7,080,225 B1 | 7/2006 | Todd | |
| 7,093,088 B1 | 8/2006 | Todd et al. | |
| 7,281,102 B1 * | 10/2007 | Agesen et al. | 711/163 |
| 7,281,124 B2 * | 10/2007 | Rothman et al. | 713/1 |
| 7,478,221 B1 * | 1/2009 | Karr et al. | 711/203 |
| 7,770,059 B1 * | 8/2010 | Glade et al. | 714/6.32 |
| 7,774,514 B2 * | 8/2010 | Chou et al. | 710/26 |
| 7,818,517 B1 * | 10/2010 | Glade et al. | 711/154 |
| 7,849,262 B1 * | 12/2010 | Glade et al. | 711/114 |
| 7,937,700 B1 * | 5/2011 | Klaiber et al. | 718/1 |
| 7,984,253 B1 * | 7/2011 | Glade et al. | 711/154 |
| 7,992,038 B1 * | 8/2011 | Glade et al. | 714/11 |
| 8,074,045 B2 * | 12/2011 | Devine et al. | 711/202 |
| 2003/0226059 A1 | 12/2003 | Braun | |
| 2004/0080558 A1 | 4/2004 | Blumenau et al. | |
| 2005/0235132 A1 * | 10/2005 | Karr et al. | 711/203 |
| 2008/0155169 A1 * | 6/2008 | Hiltgen et al. | 711/6 |

OTHER PUBLICATIONS

U.S. Appl. No. 11/536,995, filed Sep. 29, 2006.
U.S. Appl. No. 10/211,469.
U.S. Appl. No. 10/351,791.
U.S. Appl. No. 10/353,322.

(Continued)

*Primary Examiner* — Pierre-Michel Bataille
(74) *Attorney, Agent, or Firm* — Daly, Crowley, Mofford, & Durkee, LLP

(57) ABSTRACT

Technology for minimizing disruptions when host data on a physical volume is encapsulated into a virtualization layer or de-encapsulated is disclosed. Evaluation of a physical volume used as data storage for a virtualization layer before committing to direct access to the physical volume is enabled by preventing direct access before presenting the physical volume directly to the host and by preventing the virtualization layer from moving data on the physical volume while redirecting to the physical volume a first plurality of I/O requests that were directed to the virtualization layer.

11 Claims, 14 Drawing Sheets

OTHER PUBLICATIONS

EMC Corporation, EMC Invista Deployment Scenarios, by M. Waxman and B. Carr, EMC World Boston 2006, 31 pages.

EMC Corporation, Non-disruptive Data Migration with PowerPath Migration Enabler—a breakthrough technology from EMC, by J. Crum and H. Raizen, EMC World Boston 2006, 26 pages.

U.S. Appl. No. 11/607,067, Michael E. Bappe et al., filed Dec. 1, 2006.

U.S. Appl. No. 11/536,995, Helen S. Raizen, et al., filed Sep. 29, 2006.

* cited by examiner

Encapsulation

Initial

Set Up

Transition

Source Selected

Target Selected

Final

De-encapsulation

De-encapsulation Set-Up

METHODS AND SYSTEMS FOR MANAGING I/O REQUESTS TO MINIMIZE DISRUPTION REQUIRED FOR DATA ENCAPSULATION AND DE-ENCAPSULATION

RELATED APPLICATIONS

This application is a continuation-in-part of U.S. patent application Ser. No. 11/536,995, entitled "Methods And Systems For Managing I/O Requests To Minimize Disruption Required For Data Migration" and filed on Sep. 29, 2006, now U.S. Pat. No. 7,809,912 naming Helen S. Raizen, Michael E. Bappe, and Todd R. Gill as inventors, which is hereby incorporated by reference.

TECHNICAL FIELD

The present invention generally relates to the field of modifying the management of data within a computer system.

BACKGROUND INFORMATION

Many computer systems include one or more host computers, and one or more storage systems that store data used by the host computers. An example of such a computer system including a host computer 1 and storage systems 3, 4 is shown in FIG. 1.

The storage systems 3, 4 include a plurality of disk drives (5a, 5b or 6a, 6b) and a plurality of disk controllers (7a, 7b or 8a, 8b) that respectively control access to the disk drives. A plurality of storage bus directors (9, 10) control communication with host computer 1 over communication buses (17, 18). Each storage system 3, 4 further includes a cache 11, 12 to provide improved storage system performance. In particular, when the host computer 1 executes a read from one of the storage systems 3, 4, the storage system may service the read from its cache 11, 12 (when the data is stored in the cache) rather than from one of the disk drives 5a, 5b or 6a, 6b to execute the read more efficiently. Similarly, when the host computer 1 executes a write to one of the storage systems 3, 4, corresponding storage bus directors 9, 10 can execute the write to the cache 11, 12. Thereafter, the data can be de-staged asynchronously in a manner transparent to the host computer 1 to the appropriate one of the disk drives 5a, 5b, 6a, 6b. Finally, storage systems 3, 4 include internal buses 13, 14 over which storage bus directors 9, 10, disk controllers 7a, 7b, 8a, 8b and caches 11, 12 communicate.

The host computer 1 includes a processor 16 and one or more host bus adapters 15 that each controls communication between the processor 16 and one of the storage systems 3, 4 via a corresponding one of the communication buses 17, 18. It should be appreciated that rather than a single processor 16, host computer 1 can include multiple processors. Each bus 17, 18 can be any of a number of different types of communication links, with the host bus adapter 15 and storage bus directors 9, 10 being adapted to communicate using an appropriate protocol via the communication buses 17, 18 coupled there between. For example, each of the communication buses 17, 18 can be implemented as a SCSI bus with the storage bus directors 9, 10 and adapters 15 each being a SCSI driver. Alternatively, communication between the host computer 1 and the storage systems 3, 4 can be performed over a Fibre Channel fabric.

Typically, the storage systems 3, 4 make storage resources available to the host computer for assignment to entities therein, such as a file system, a database manager, or a logical volume manager. If the storage systems are so-called "dumb" storage systems, the storage resources that are made available to the host computer will correspond in a one-to-one relationship to physical storage devices within the storage systems. However, when the storage systems are intelligent storage systems, they will present logical volumes of storage to the host computer 1 that need not necessarily correspond in a one-to-one relationship to any physical storage devices within the storage system. Instead, the intelligent storage systems may map each logical volume of storage presented to the host across one or more physical storage devices.

Conventional data migration efforts typically involve the following four separate steps, requiring manual intervention between each: source discovery, target provisioning, data synchronization (i.e., movement), and reconfiguration to switch to target access. The source discovery step includes identification of the physical locations (e.g., the storage system and logical unit) at which the data set is stored. The target provisioning step includes identification and configuration of the storage resources (typically logical volumes of storage presented by another storage system) to which the data set will be moved. The synchronization step involves moving or copying the data set from the source locations to the target locations. After the data set has been moved or copied, the switch to target step typically involves reconfiguring the computer system so that applications using the data set recognize the target locations as the new storage location for the data set. Several of the steps conventionally require human intervention and may require rebooting of the host computer(s) that access the data set.

EMC Corp. has previously recognized the desirability of being able to migrate data non-disruptively. U.S. Pat. No. 7,093,088 and U.S. patent application Ser. No. 11/536,995, for example, disclose some methods and systems that enable less disruptive migration.

Administrators of computer systems like that depicted in FIG. 1 may want to encapsulate a physical volume of data. One common reason is that this speeds up the process of transitioning a storage volume into network virtualized storage by avoiding data copies. Other common reasons include avoiding the need for additional storage during the migration process. The act of transitioning storage from array-based storage to network virtualized storage allows that storage to gain the benefits provided by network virtualized storage including inter-array replication, application transparent data mobility, and flexibility in the quality of service provided for a volume.

Like data migration, data encapsulation and de-encapsulation may be complicated and problematic exercises. Administrators may be required to take offline any applications executing on the host that use the physical volume. Taking applications offline may lead to a loss of productivity, and opportunity costs associated with not having the data available for important business functions. Encapsulations and de-encapsulations typically are manual labor-intensive efforts, and are therefore error-prone, costly, and labor-intensive.

SUMMARY

The inventors recognized that when encapsulating data in a physical volume with a virtual volume or when de-encapsulating that data, it would be desirable for a host to be able to access the relevant data throughout the process, or at least for as much of the process as possible. The inventors recognized that the appropriate management of input/output (I/O) requests during the encapsulation or de-encapsulation process can be used to render the process less disruptive to a host that has data stored in the physical volume. The inventors further recognized that the possibility of errors or other problems during the encapsulation or de-encapsulation process can be minimized by implementing controls over input/output requests during this process and applying these controls in a particular sequence. The inventors recognized that the technology designed to enable less disruptive data migration can be leveraged to enable less disruptive encapsulation and de-encapsulation of data. The inventors further recognized that the involvement of a virtualization layer in the encapsulation and/or de-encapsulation, and its capabilities, may present challenges and opportunities not encountered with other types of data migration. The inventors recognized that capabilities, such as a virtualization layer's ability to migrate data in a way that is transparent to the host, must be considered to minimize disruption in the encapsulation and/or de-encapsulation process. The inventors also recognized that the virtualization layer itself may be used to protect data during the encapsulation and/or de-encapsulation process.

One possible benefit of the use of methods and systems consistent with features and principles of the invention during encapsulation or de-encapsulation is the capability of switching back and forth between a physical volume and a virtual volume before committing to the virtual volume during an encapsulation process or before committing to the physical volume during a de-encapsulation process. Other possible benefits of management of I/O requests consistent with features and principles of the invention during the encapsulation or de-encapsulation process include the capability of preventing another user from modifying the configuration of a physical volume during the encapsulation process. A further possible benefit of appropriate management of I/O requests is the capability of preventing access to physical volumes and related virtual volumes at the same time.

One embodiment consistent with principles of the invention is a method for enabling the evaluation of the encapsulation of a physical volume in a virtual volume before committing to the virtual volume that comprises a logical representation of the physical volume. The method includes preventing access to the physical volume through the virtualization layer before presenting the virtual volume to a host. The method further includes preventing the virtualization layer from moving data on the physical volume while redirecting to the virtual volume a first plurality of I/O requests that were directed to the physical volume.

Another embodiment consistent with principles of the invention is a method for enabling evaluation of direct access to a physical volume used as data storage for a virtual volume before committing to the direct access. The virtual volume comprises a logical representation of the physical volume. The method includes preventing direct access to the physical volume before presenting the physical volume directly to a host. The method further includes preventing the virtualization layer from moving data on the physical volume while redirecting to the physical volume a first plurality of I/O requests that were directed to the virtual volume. This method can be used, for example, as part of the process of de-encapsulating an encapsulated physical volume.

Another embodiment consistent with principles of the invention is a method for enabling evaluation of a physical volume used as data storage for a virtualization layer before committing to direct access to the physical volume. The virtual volume comprises a logical representation of the physical volume. The method includes preventing direct access to the physical volume before presenting the physical volume directly to a host; and preventing the virtualization layer from moving data on the physical volume while redirecting to the physical volume a first plurality of I/O requests that were directed to the virtual volume.

Another embodiment consistent with principles of the invention is system comprising a host computer and a virtualization layer in signal communication with a physical volume, either directly or via the virtualization layer. The system is configured with instructions to perform one of the foregoing methods.

Another embodiment consistent with principles of the invention is a computer-readable medium including instructions to configure a system to execute one of the foregoing methods. In one embodiment, the medium includes a program for installation and execution on a host computer and/or a virtualization layer associated with one or more volumes of data.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

Reference is now made in detail to illustrative embodiments of the invention, examples of which are shown in the accompanying drawings.

The inventors of the present invention recognized that the present invention may be implemented, among other ways, as a filter driver in the I/O stack. The POWERPATH tool, available by EMC Corporation of Hopkinton, Mass., is an example of an I/O filter driver. In the exemplary embodiment illustrated in FIG. 2, the invention is implemented as an extension to the POWERPATH tool.

Figure 1:
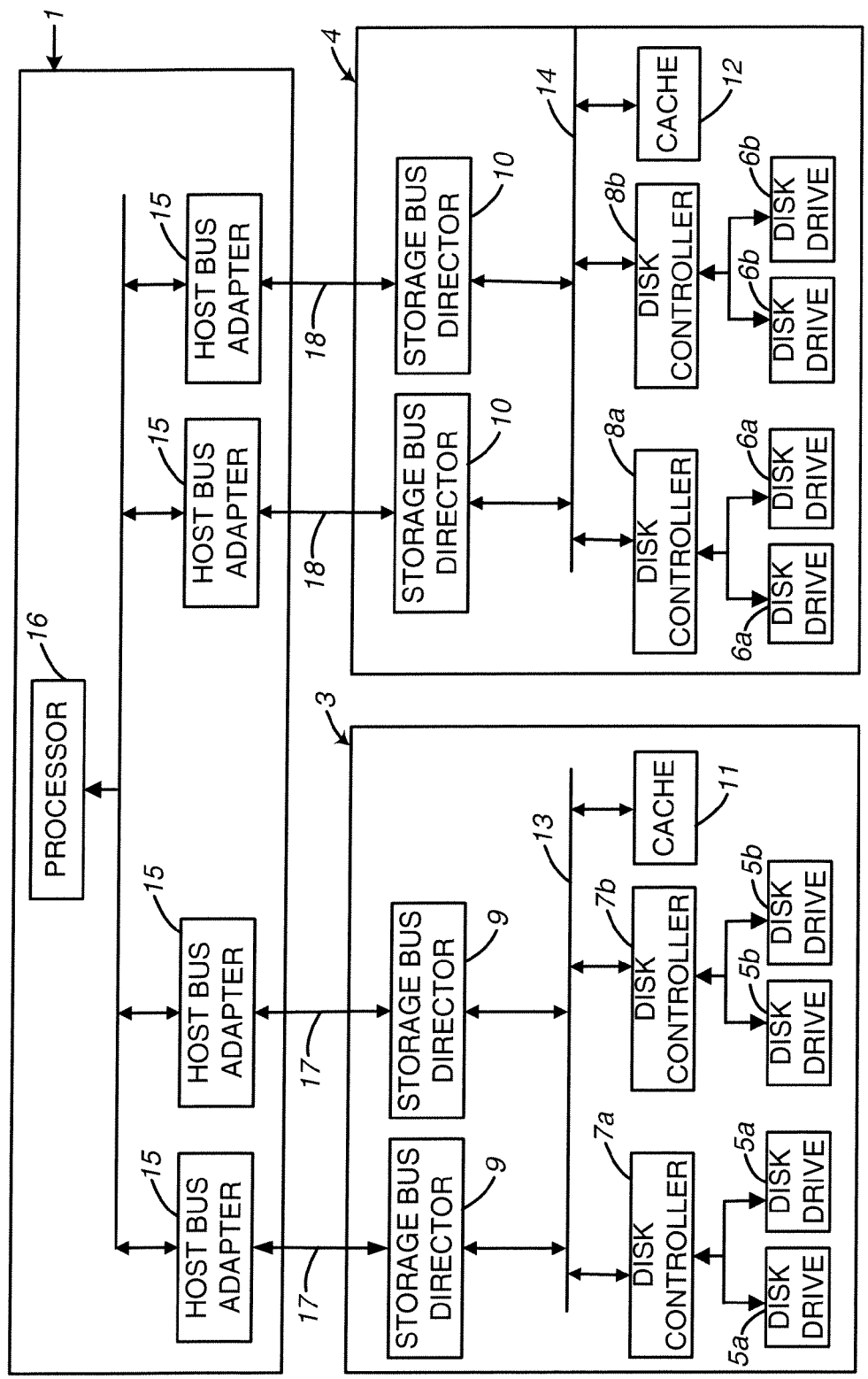
FIG. 1 is an exemplary computer system prior to encapsulation of a volume of data, consistent with an embodiment of the present invention.
Figure 2:
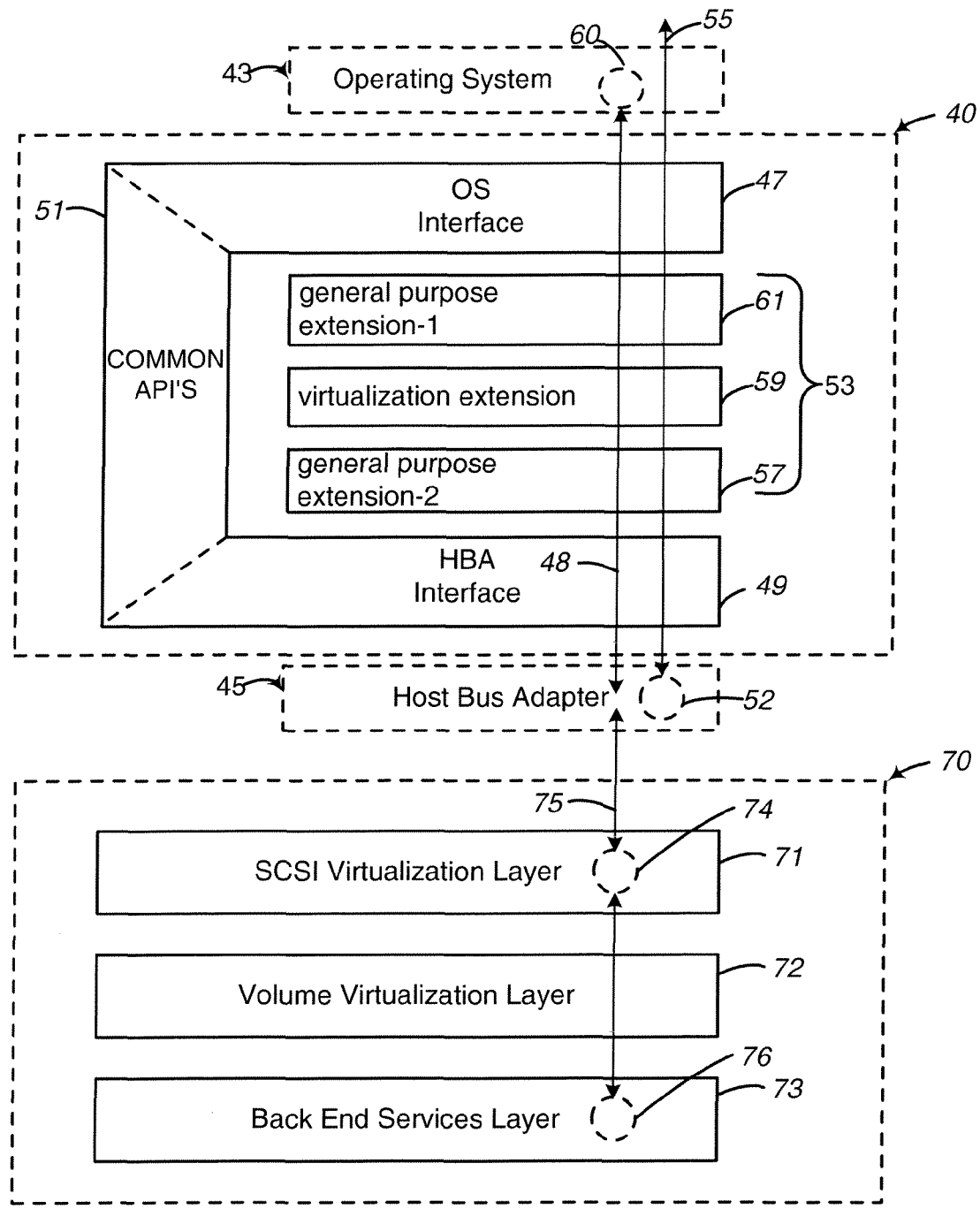
FIG. 2 is an exemplary software architecture for managing I/O request during encapsulation and/or de-encapsulation, consistent with an embodiment of the present invention.

Although filter driver 40 only interacts with an operating system (OS) 43, as illustrated in FIG. 2, filter driver 40 can conceptually be considered to be placed between OS 43 and at least one host bus adapter 45, such as host bus adapter 15 in FIG. 1. A data storage system, such as storage system 3 in FIG. 1, presents volumes of data storage to the host computer for assignment to various resources therein, such as to provide storage space for a file system, an LVM, or a database. Volumes are presented via signals arriving at the collection of host bus adapters 45 on the host. These signals are processed by filter driver 40, which creates a volume representation 60. Functionality may be attributed to the volume representation.

Filter driver 40 of FIG. 2 may be thought of conceptually as having the form of a "C" clamp with a top horizontal arm 47, a bottom horizontal arm 49, and a vertical connector 51 between the arms. Horizontal arm 47 may be, for example, an interface to any operating system (OS) such as Sun's SOLARIS, LINUX, and Microsoft's WINDOWS NT. Bottom horizontal arm 49 includes platform-dependent code comprising an interface 48 to relevant host bus adapters. Vertical connector 51 comprises a series of common Application Programming Interfaces (APIs). An advantage of the C clamp is that extensions can be written in a platform-independent manner because the arms 47, 49 and vertical connector 51 translate all of the platform-dependent communications into more generic communications. An extension stack 53 is enveloped between arms 47 and 49. In addition to a plurality of existing extensions 61, 57 in extension stack 53, a DM extension 59 is added in the embodiment of FIG. 2 to manage I/O requests during a data encapsulation or de-encapsulation process. DM extension 59 can consist of a plurality of extensions. DM extension 59, or portions thereof, may also be used during a data migration process.

The software architecture of virtualization layer 70 can be viewed as consisting of a SCSI virtualization layer 71, a volume virtualization layer 72, and a back-end services layer 73. SCSI virtualization layer 71 is responsible for presenting virtual storage volumes, such as volume 74 to the at least one host bus adaptor 45 via an interface 75. Volume virtualization layer 72 creates virtual volumes by composing at least one storage element 76. Back-end services layer 73 imports physical storage and creates the at least one storage element 76.

Figure 3A:
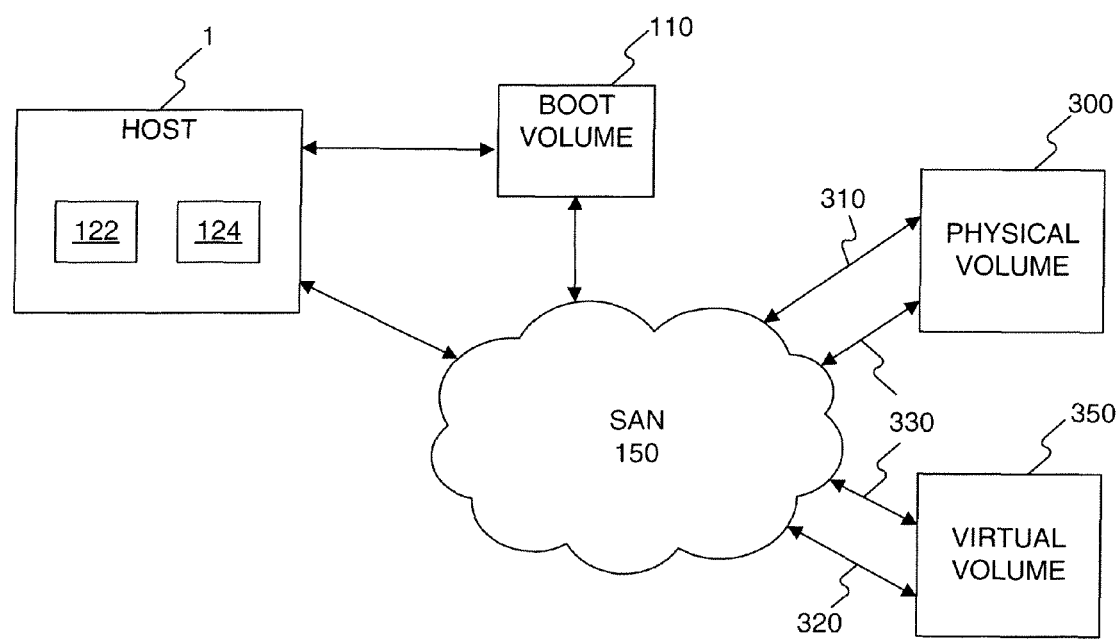
FIG. 3A is exemplary system architecture associated with the encapsulation and/or de-encapsulation process, consistent with an embodiment of the present invention.

FIG. 3A illustrates exemplary architecture for managing I/O requests during encapsulation or de-encapsulation. FIG. 3A includes at least one host computer 1, a boot device 110, a network 150, a physical volume 300 and a virtual volume 350 that may be presented to host computer 1. Physical volume 300 provides data storage. Physical volume 300 may be anything from a simple data storage device to a complex system that provides data storage, such as a FAStT data storage system from IBM, a TagmaStore data storage system from HDS, or a CLARiiON or SYMMETRIX data storage system from EMC Corporation. Network 150 enables communication between host computer 1, physical volume 300, and virtual volume 350. Network 150 may also enable communication between host computer 1 and boot device 110. Network 150 may be, for example, a Fibre Channel fabric. Alternatively, network 150 may include, among other components, SCSI buses 17, 18 and SCSI drivers 9, 10, 15 all of FIG. 1.

Host computer 1 uses physical volume 300 to store data. Physical volume 300, including the data contained therein, can be encapsulated in virtual volume 350. Prior to encapsulation of physical volume 300, host 1 uses link 310 to access data on volume 300. Links 320 and 330 in FIG. 3A may not exist. After encapsulation, host 1 uses link 320 in FIG. 3A to access data on physical volume 300 only via virtual volume 350 and link 330. Link 310 in FIG. 3A may not exist.

Virtualization layer 70 can present virtual volume 350 with storage provided by physical volume 300 to host 1. During the encapsulation process, host computer 1 can store data about the state and/or status of the process in boot device 110. This metadata may be stored in the boot device 110, for example, as kernel metadata or user metadata. Storing kernel and/or user metadata can enable the process to resume in the same state after either a crash or a graceful shutdown and restart during the encapsulation or de-encapsulation process. To enable the host computer 1 to resume the process smoothly after a crash, boot device 110 must be the first device the host computer accesses during the host boot process. Accordingly, the host computer 1 may enable the kernel state of the process to be restored during a reboot.

Figure 3B:
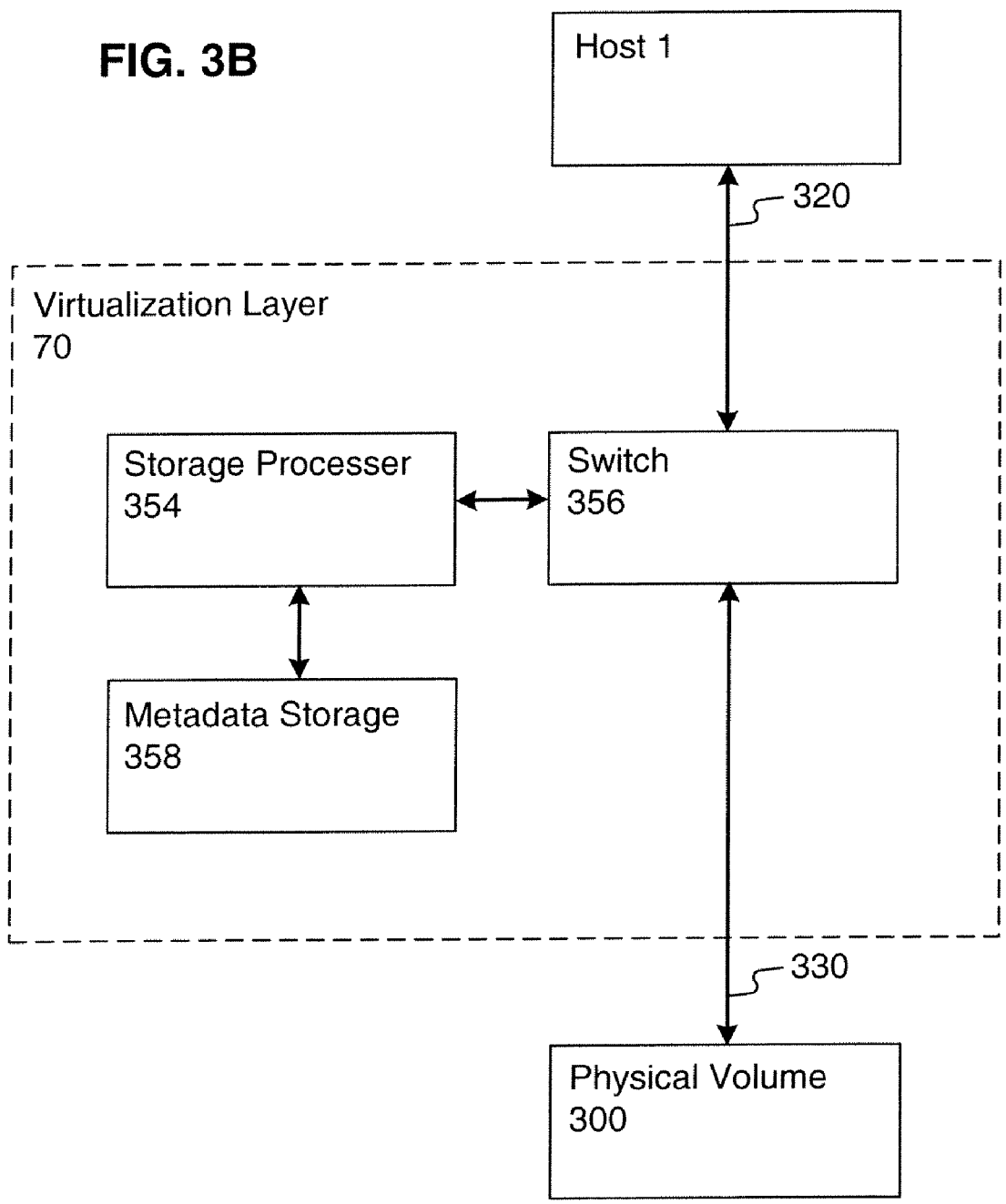
FIG. 3B is an exemplary architecture for a layer providing network-based block storage virtualization used to encapsulate a physical volume, consistent with an embodiment of the present invention.

FIG. 3B illustrates an exemplary block storage virtualization layer 70 in the context of the exemplary architecture of FIG. 3A. Virtualization Layer 70 is interposed between host 1 and physical volume 300 when physical volume 300 is encapsulated. Virtualization layer 70 includes a switch 356, a storage processor 354, and metadata storage 358. Switch 356 can be, for example, a Brocade AP7420 or a Cisco MDS 9500 series switch. Storage processor 354 controls switch 356, for example, using data stored on metadata storage 358 and virtualization software. The virtualization software may be, for example, INVISTA software available from EMC Corporation of Hopkinton, Mass. Metadata storage 358 may be any memory device capable of storing data about the characteristics of physical volume 300 and its presentation to host 1. Alternatively, block storage virtualization layer 70 may be implemented as described in U.S. Pat. No. 7,206,863, entitled "System And Method For Managing Storage Networks And Providing Virtualization Of Resources In Such A Network" and issued on Apr. 17, 2007 to assignee EMC Corp.

Figure 4:
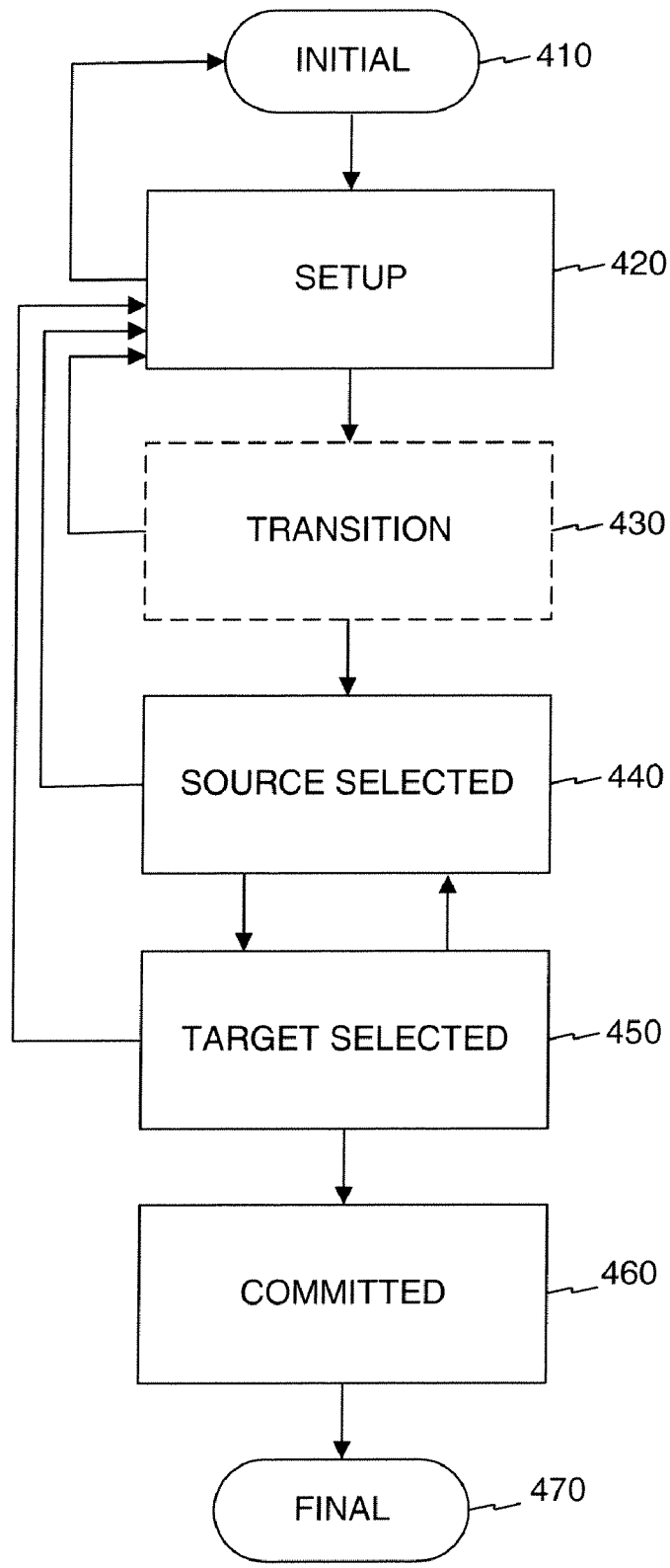
FIG. 4 is a diagram of exemplary states in an encapsulation process, consistent with an embodiment of the present invention.

FIG. 4 is a diagram 400 of exemplary states in a process for encapsulating a physical volume in a virtual volume, consistent with an embodiment of the present invention. In the exemplary embodiment, host applications access data in the physical volume with a source user device name. During encapsulation, a user can control transitions between different stages in the encapsulation process, using among other things a program running in user space and filter driver 40. The stages are referred to as "states." Changing from one state to another state is referred to as a "state transition." As shown in FIG. 4, arrows represent possible state transitions that may occur during encapsulation. Initial state 410 of FIG. 4 is a state that exists prior to any encapsulation operation.

Setup state 420 is reached after the user issues a command, such as a SETUP command, to begin the encapsulation process. In the setup state 420, all preparation required before encapsulation of a physical logical unit as a target virtual logical unit is completed. Setup state 420 may also be reached as a result of aborting an encapsulation. From setup state 420, the user has the choice of continuing to a source selected state 440, or returning to an initial state 410, which eliminates the state changes that were made to reach setup state 420.

In embodiments of the invention that are also designed to enable data migration, an intermediate state 430 that enables a target volume to synchronize with a source volume may exist between the setup state 420 and the source selected state 440. In these embodiments, DM extension 59 may confirm that the target volume and the source volume store the same data before transitioning to a source selected state 440.

The source selected state 440 in the encapsulation process is reached after the user issues a command, such as a SYNC command, to initiate a transition from the setup state 420 to the next state in the encapsulation process. In source selected state 440, data in the physical volume may only be accessed via the source logical unit. From source selected state 440, the user may choose to return to setup state 420. To continue the encapsulation process from source selected state 440, however, the user may issue a command to move to a target selected state 450.

Target selected state 450 is reached after the user issues a command, such as a SELECT TARGET command, to initiate a transition from the source selected state 440 to the next state in the encapsulation process. In target selected state 450, data in the physical volume may only be accessed via the virtual volume. From target selected state 450, the user may choose to return to source selected state 440 or to setup state 420. To continue the encapsulation process from target selected state 450, however, the user may issue a command to move to a committed state 460.

Generally committed state 460 is reached after the user issues a command, such as a COMMIT command, to initiate a transition from the target selected state 450 to the next state in the encapsulation process. In committed state 460, data in the physical volume may no longer be accessed directly via the physical volume. Thus, the encapsulation process cannot be aborted from committed state 460. The user may issue the commit command after he is satisfied with an evaluation of the virtual volume.

Final state 470 is reached after the user issues a command, such as a CLEANUP command, to initiate a transition from the committed state 460 to the next state in the encapsulation process. In the transition, the system verifies that the physical volume is no longer accessible to the host. If it finds that it is still accessible, the cleanup will fail and the encapsulation process will remain in the committed state. In the committed state, access to the source volume is prevented by the DM extension. This access control must remain in place until the source volume has been physically removed from the host.

As discussed above, various commands may be issued by the user to transition from one state to another. State transitions can be initiated by additional commands available to the user. For example, a user may issue a command, such as the SELECT SOURCE command, to initiate the transition from target selected state 450 to source selected state 440. Furthermore, a user may issue a command to initiate the transition from any state in FIG. 4 except committed state 460 and final state 470 back to setup state 420. A transition back to setup state 420 may be considered an abort of the encapsulation process.

The encapsulation process states illustrated in FIG. 4 can be related to links conceptually illustrated in FIG. 3A. In the initial state 410, link 310 makes data on physical volume 300 accessible to the host 1, but links 320 and 330 do not exist. In the final state 470, links 320 and 330 make data on physical volume 300 accessible to host 1, but link 310 does not exist. In the intermediate states, the links are configured and checked while I/O requests are managed to protect the data on physical volume 300 and minimize the disruption required by the encapsulation process. The system architecture may alternatively include a direct connection of links 310 and 320 to host 1 and not through SAN 150.

Table 1 summarizes exemplary management of I/O requests in various layers during various states in the encapsulation process identified in FIG. 4. The first two rows of Table 1 refer to management in host computer 1, which may be implemented in filter driver 40. The last row of Table 1 refers to management in virtualization layer 70.

TABLE 1

Exemplary Management of I/O Requests
in Different States in the Encapsulation Process

| STATE | Setup | Source Selected | Target Selected | Committed | Final |
|---|---|---|---|---|---|
| Redirection | none | none | cross (2-way) redirection | none | none |
| Access Control | none | Virtual Volume | Physical volume | Physical volume | none |
| SE Attribute | Not Ready | Test | Test | Normal | Normal |

FIGS. 5-10 elaborate on Table 1 and illustrate exemplary flows of I/O requests during various states identified in FIG. 4. For consistency, FIGS. 5-11 each illustrate the same levels in the flow of I/O requests. Each of the illustrated levels, however, may not be relevant to any single state.

Figure 5:
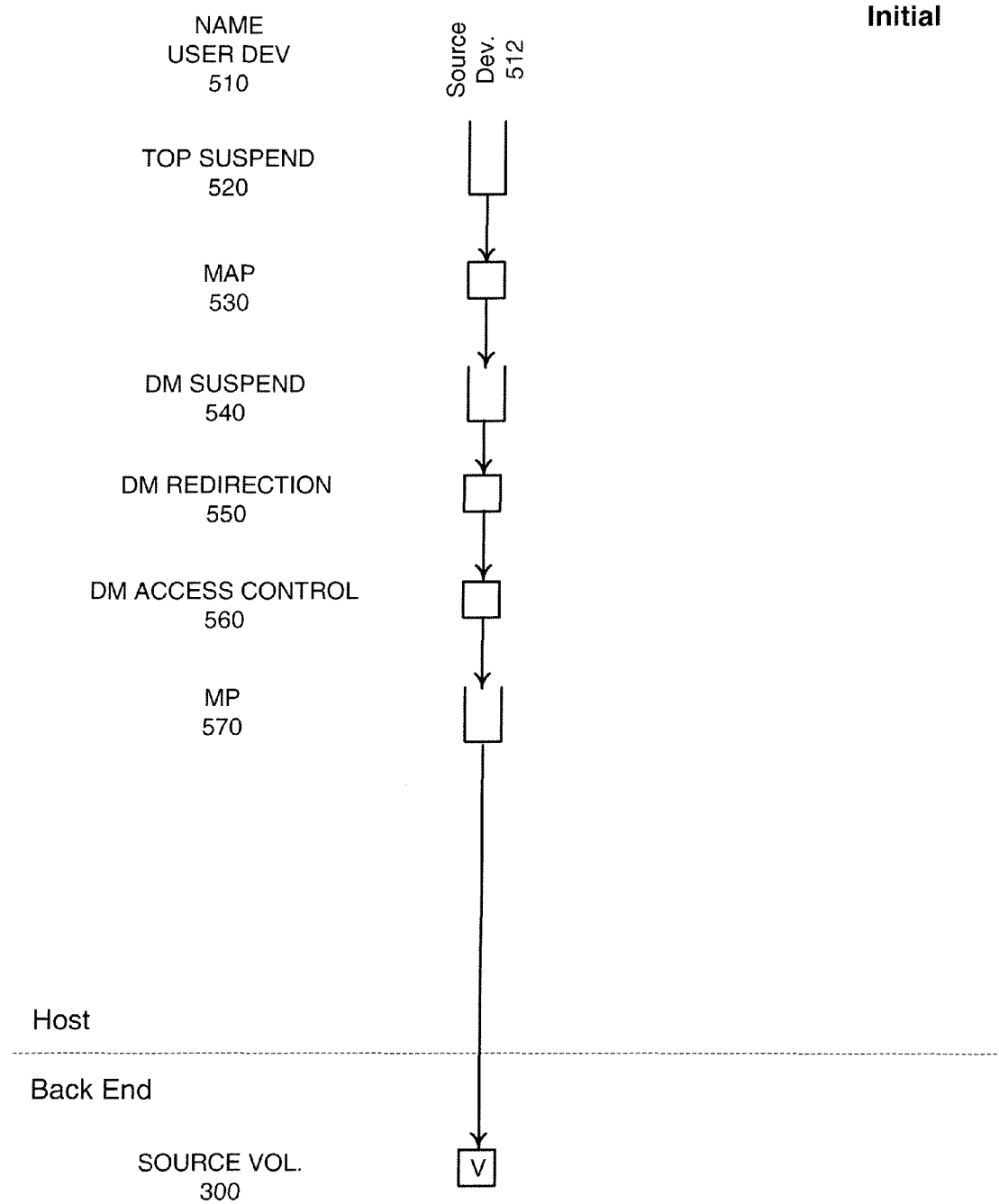
FIG. 5 is a diagram of an exemplary flow of I/O requests during an initial state of encapsulation, consistent with an embodiment of the present invention.

FIG. 5 is a flow diagram conceptually illustrating exemplary management of I/O requests at various layers in initial state 410 of FIG. 4, consistent with an embodiment of the present invention. In layer 510 of FIG. 5, source user device 512 represents one or more ways that physical volume 300 may be addressed by a host I/O request. For example, physical volume 300 may be addressed with a native name or a pseudo name. U.S. patent application Ser. No. 11/427,889—which is entitled "Methods And Systems For Migrating Data With Minimal Disruption" and which was filed on Jun. 30, 2006, naming M. Bappe and H. Raizen as inventors—discloses methods and systems whereby I/O requests can reach a data storage volume using a pseudo name.

Layers 520, 530, and 570 in FIG. 5 are each managed by one or more existing extensions 61, 57 of the extension stack 53 shown in FIG. 2 in this exemplary embodiment. Layer 520 of FIG. 5 represents a first layer at which I/O requests addressed to a physical volume 300 may be suspended. Suspended I/O requests may be queued so that they can be executed when an appropriate state has been reached. Layer 530 of FIG. 5 represents a mapping layer. Layer 530 in initial state 410 may map a pseudo and/or native name—used by a host application in level 510 to access data on physical volume 300—to an inherent device identifier of a data storage volume or of a physical connection to a data storage volume. Layer 530 enables host 1 to address physical volume 300 with a pseudo name and/or native names.

Layers 540, 550, and 560 may be managed by DM extension 59 of FIG. 2 in the exemplary embodiment. To increase the processing speed, I/O requests need not flow through layers 540, 550, and 560 prior to the initiation of an encapsulation process.

Layer 570 in FIG. 5 represents a multipath layer. In initial state 410, layer 570 maps I/O requests that were on paths addressed by a native or pseudo name to physical volume 300. Thus, layer 570 routes I/O requests that were on paths addressed by a native or pseudo name to physical volume 300. At the bottom of FIG. 5, a physical volume 300 is illustrated.

Figure 6A:
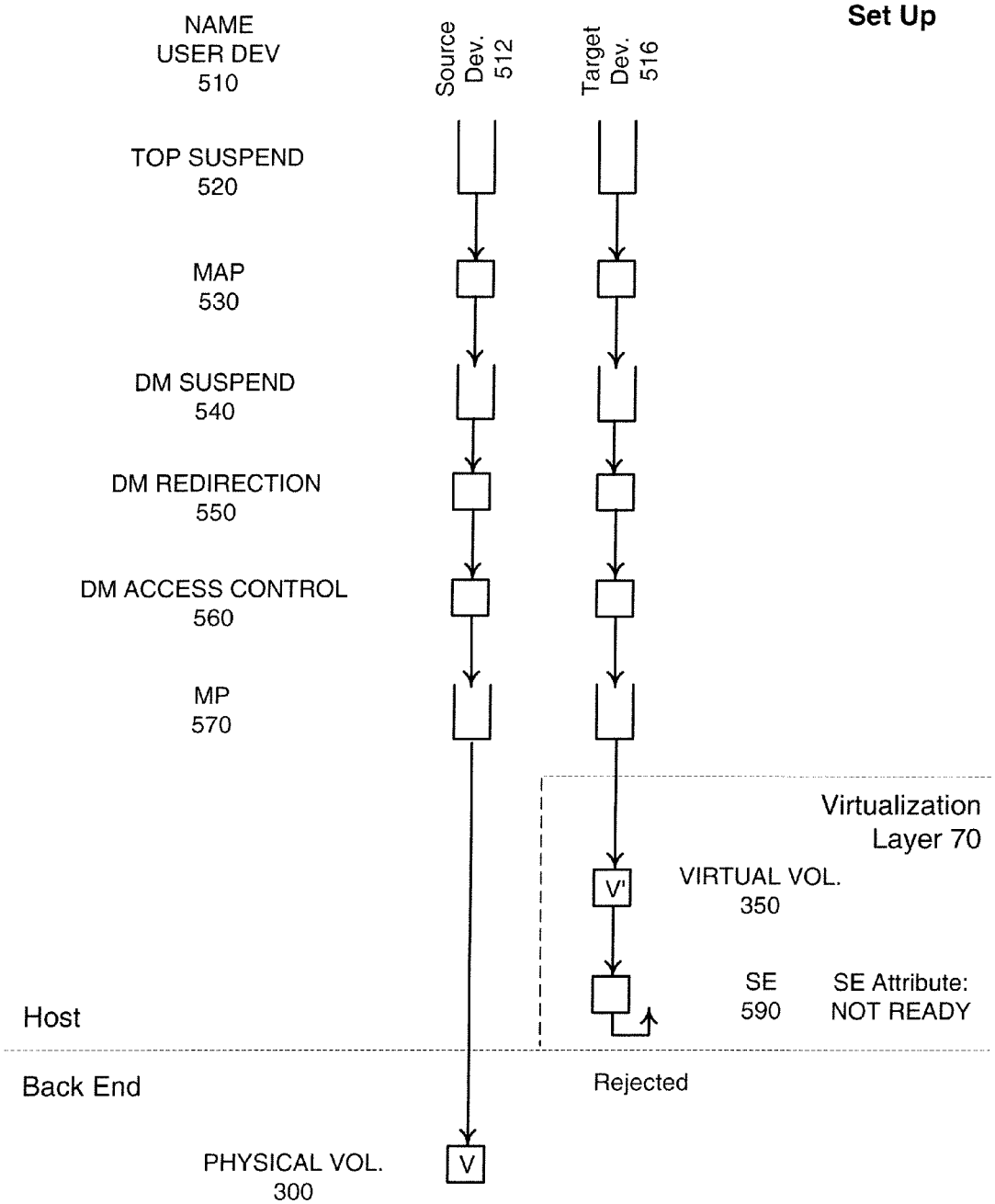
FIG. 6A is a diagram of an exemplary flow of I/O requests during a set up state of encapsulation, consistent with an embodiment of the present invention.

FIG. 6A is a flow diagram conceptually illustrating exemplary management of I/O requests at various layers in set up state 420 of FIG. 4, consistent with an embodiment of the present invention. At the bottom of FIG. 6A, a physical volume 300 is illustrated with a potential I/O request pathway via virtual volume 350. In set-up state 420, virtualization layer 70 has been configured to prepare for host access to data on the physical volume 300 via virtual volume 350. The portion of the flow diagram labeled "Virtualization Layer" is not part of the host, but may be, for example, block storage virtualization layer 70.

Setup state 420 is reached, for example, after a SET UP command, which is initiated by a user, initializes an encapsulation operation. Prior to setup state 420, physical volume 300 and virtual volume 350 are identified. A representation of physical volume 300 is imported into the virtualization layer as a storage element 590. The virtualization layer stores identifying information associated with storage element 590 such as its array identifier, its volume identifier, its capacity, and/or its firmware level. Storage element 590 logically references the volume, V, that it consumes without providing any additional data storage. Virtualization layer 70 may also associate a new attribute with storage element 590 and gives the attribute a protection value, such as NOT READY. The NOT READY value prevents the virtualization layer from treating imported storage element 590 as storage whose data is accessible. A virtual volume V', also referred to as virtual volume 350, is created to encapsulate storage element 590. Finally, virtual volume V' is presented to host 1 as a target user device 516.

Conceptually, the system in set up state 420 is configured to prepare for the flow shown on the right side of FIG. 6A. In layer 510 of FIG. 6A, target user device 516 represents one way that virtual volume 350 may be addressed by a host I/O request. For example, virtual volume 350 may be addressed with a native name or a pseudo name. I/O requests in layers 510, 520, 530, and 570 of FIG. 6A are managed similarly to I/O requests in layers 510, 520, 530, and 570 of FIG. 5.

Layer 540 of FIG. 6A represents a second layer at which I/O requests addressed to a data storage volume may be suspended and later resumed. Layer 540 is used to transition between different states, such as initial state 410 and set up state 420. A state change is initiated, for example, by issuing a state change command such as a SET UP command. Layer 540 allows I/O requests that are pending before a state change is initiated to execute. I/O requests that arrive after a state change is initiated, however, are queued in layer 540 so that they can be executed when an appropriate state has been reached. In any of the states such as setup state 420, I/O requests are not suspended in layer 540.

Layer 550 of FIG. 6A represents a layer at which I/O requests may be redirected from one volume of data to another. In setup state 420, I/O requests are not redirected in layer 550.

Layer 560 of FIG. 6A represents a layer at which I/O requests may be prevented from accessing a data storage volume. In setup state 420, I/O requests may be prevented from accessing virtual volume 350 in layer 560. Access control is useful to prevent the host from accessing data both through virtual volume 350 and physical volume 300 directly. If such situation does occur, the host operating system and applications may become confused. The protection state of the attribute associated with storage element 590 may also be used to prevent access to physical volume 300 via virtual volume 350.

Prior to transitioning to SETUP state 420, host computer 1 confirms that the encapsulation process is ready to move forward. For example, the exemplary embodiment confirms that the array identifier, the volume identifier, the capacity, and/or the firmware level of the storage element 590 match that of physical volume 300. The exemplary embodiment may further confirm that the value of the new attribute for the storage element is NOT READY. The exemplary embodiment may also confirm that virtual volume 350 is a one-to-one representation of the storage element 590.

Figure 6B:
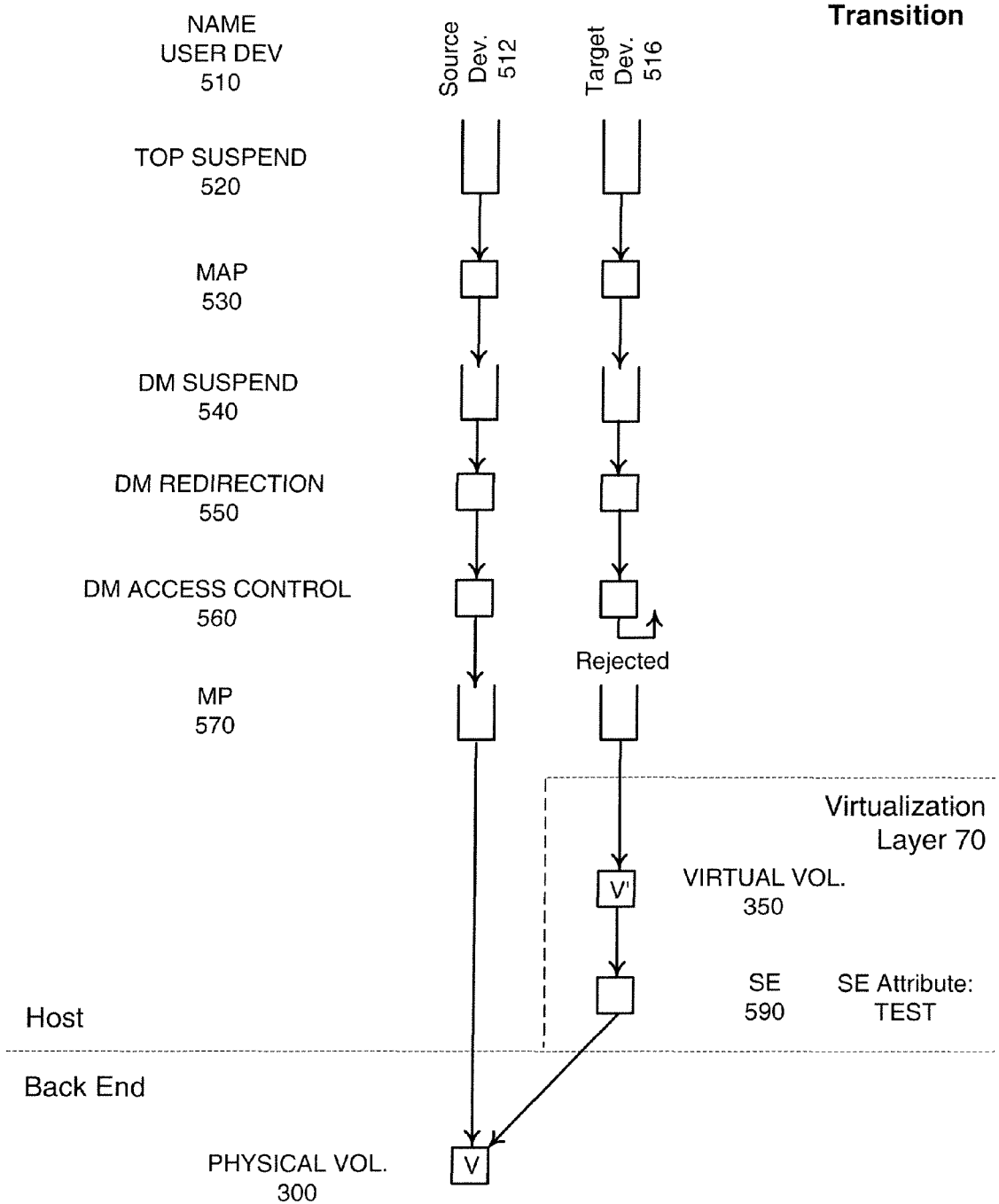
FIG. 6B is a diagram of an exemplary flow of I/O requests during a transition state of encapsulation, consistent with an embodiment of the present invention.

FIG. 6B is a flow diagram conceptually illustrating exemplary management of I/O requests at various layers in optional transition state 430 of FIG. 4, consistent with an embodiment of the present invention. In transition state 430 as illustrated in FIG. 6B, I/O requests are prevented from accessing virtual volume 350 in layer 560. Similarly, in transition state 430 as illustrated in FIG. 6B, the SE attribute of the volume has a TEST value. The TEST attribute value allows I/Os to be issued to the volume from the host, but prevents the addition of network virtualization features to the volume that would move data from the physical volume 300. In other words, the data on physical volume 300 continues to reside there and cannot be moved during the encapsulation process while the SE is in TEST attribute value.

Figure 7:
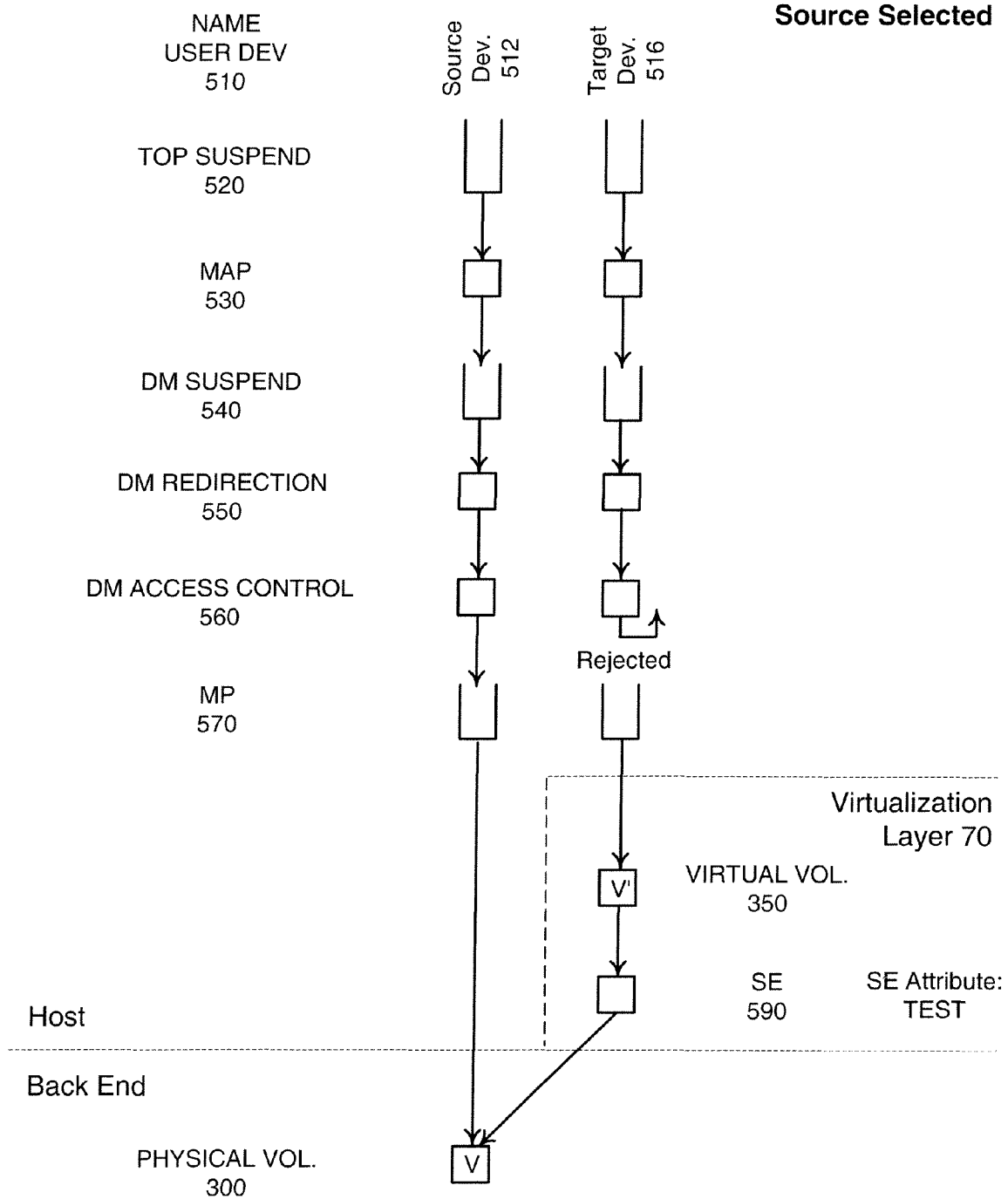
FIG. 7 is a diagram of an exemplary flow of I/O requests during a source selected state of encapsulation, consistent with an embodiment of the present invention.

FIG. 7 is a flow diagram conceptually illustrating exemplary management of I/O requests at various layers in source selected state 440 of FIG. 4, consistent with an embodiment of the present invention. Source selected state 440 is reached, for example, after a SYNC command. In the exemplary embodiment, the command to transition to source selected state 440 may initiate two changes: (1) it ensures that access control layer 560 prevents access to virtual volume 350; and (2) it causes virtualization layer 70 to set the SE attribute to the TEST value. As noted above, for example, in embodiments including an optional transition state 430, one or more of the foregoing changes may be made prior to moving to source selected state 440.

Management of I/O requests in source selected state 440 is illustrated beginning at layer 510 in FIG. 7. I/O requests in most layers of FIG. 7 are managed similarly to I/O requests in the corresponding layers of FIG. 6A. Whereas access control layer 560 may or may not allow I/O requests in set up state 420 to proceed to virtual volume 350, access control layer 560 does not allow I/O requests in source selected state 440 to proceed to virtual volume 350.

Figure 8:
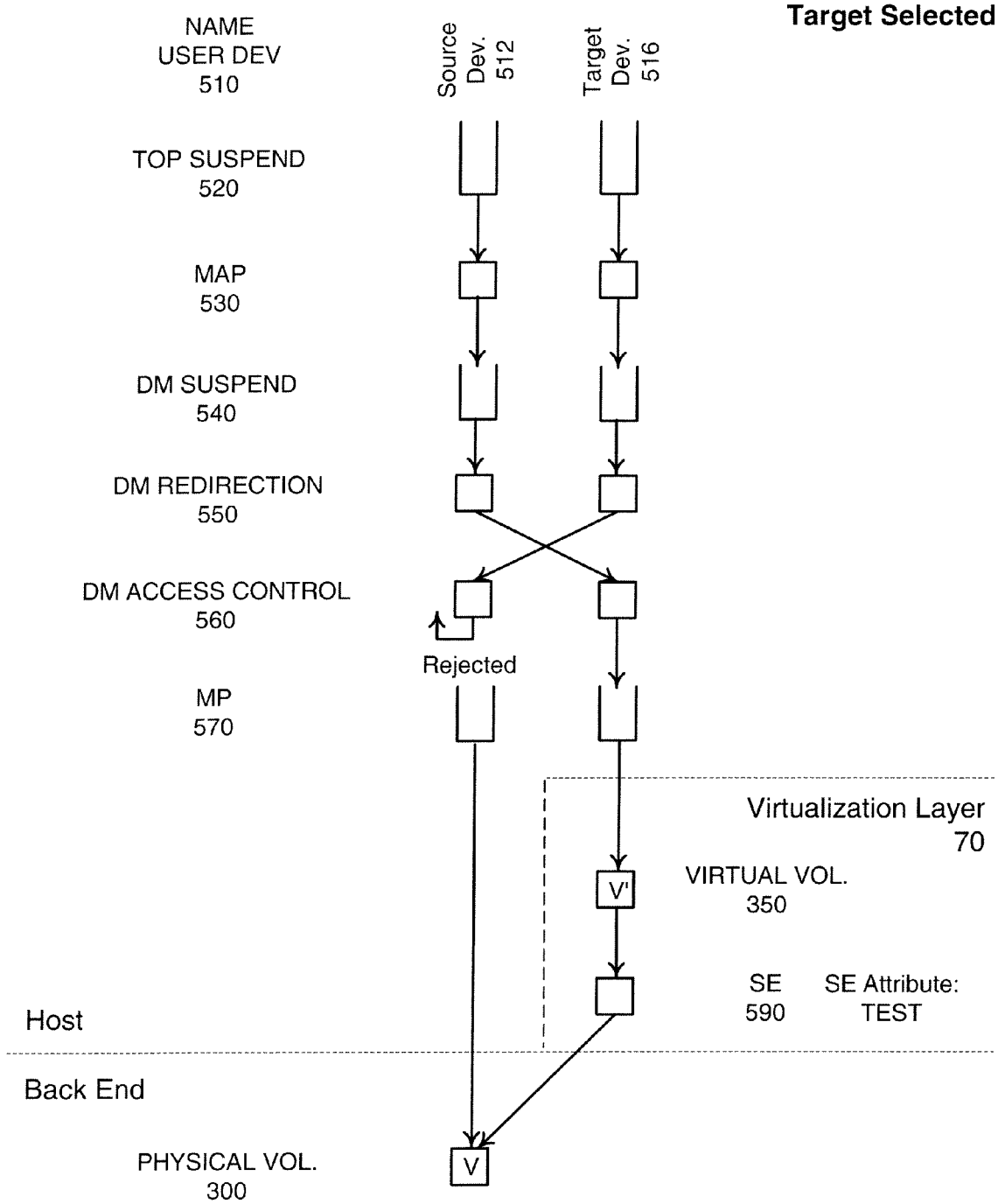
FIG. 8 is a diagram of an exemplary flow of I/O requests during a target selected state of encapsulation, consistent with an embodiment of the present invention.

FIG. 8 is a flow diagram conceptually illustrating exemplary management of I/O requests at various layers in target selected state 450 of FIG. 4, consistent with an embodiment of the present invention. The target selected state 450 illustrated in FIG. 8 can be reached, for example, after a SETUP command specifying encapsulation, a SYNC command, and a TARGET SELECT command are issued.

I/O requests in layers 510, 520, 530, 540, and 570 of FIG. 8 are managed similarly to I/O requests in layers 510, 520, 530, 540, and 570 of FIG. 7. In target selected state 450 of FIG. 8, however, I/O requests that had been directed to physical volume 300, such as by user device name 512, are redirected to virtual volume 350 in level 550. In target selected state 450 of FIG. 8, any I/O requests that had been directed to virtual volume 350, such as by user device name 516, are also redirected to physical volume 300 in level 550. Although no I/O requests should be directed to virtual volume 350, such cross-redirection in level 550 prevents accidental data corruption by enabling any such I/O requests to be easily handled in level 560.

In layer 560 of FIG. 8, I/O requests are prevented from accessing physical volume 300. I/O requests following a path to virtual volume 350 in layer 540 of FIG. 8 are redirected in layer 550, then prevented from accessing any logical unit in layer 560. Layer 550 enables the transition—from direct access to access via virtual volume 350—to be less disruptive to a host trying to encapsulate data stored in the physical volume 300.

Figure 9:
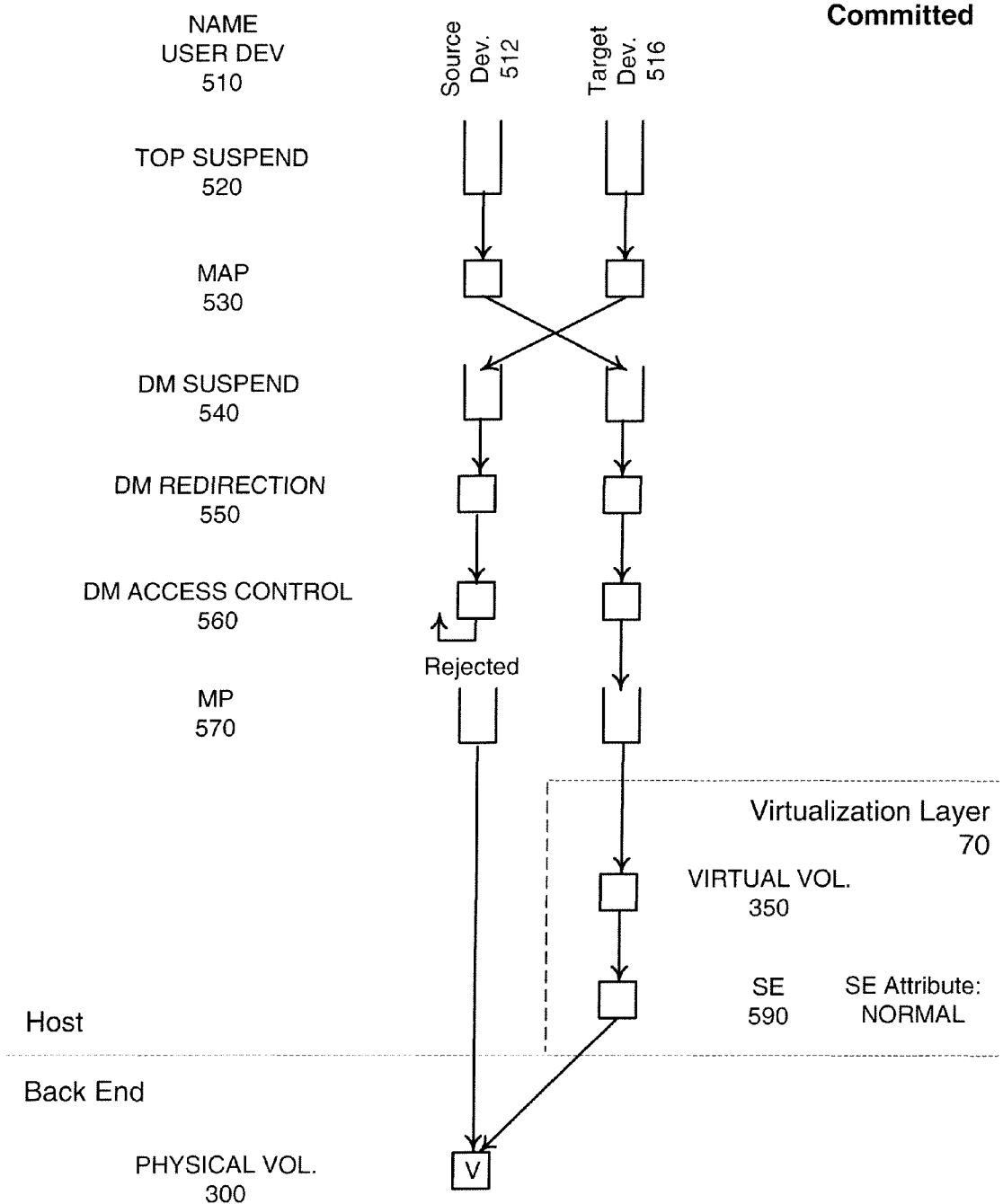
FIG. 9 is a diagram of an exemplary flow of I/O requests during a committed state of encapsulation, consistent with an embodiment of the present invention.

FIG. 9 is a flow diagram conceptually illustrating exemplary management of I/O requests at various layers in committed state 460 of FIG. 4, consistent with an embodiment of the present invention. In committed state 460 illustrated in FIG. 9, the redirection that existed in layer 550 in target selected state 450 is eliminated. Instead, layer 530 maps source user device 512 to the device identifier of virtual volume 350, which was previously mapped to target user device 516. Layer 530 may also map target user device 516 to the device identifier of physical volume 300, which was previously mapped to source user device 512.

Committed state 460 is reached after the user issues a command, such as a COMMIT command, to transition from the target selected state 450 to the next state in the encapsulation process. As a result of the COMMIT command, the new attribute for storage element 590 in virtualization layer 70 is set to a NORMAL value. The NORMAL attribute value allows the virtualization layer 70 to move data from physical volume 300 to another physical volume.

Figure 10:
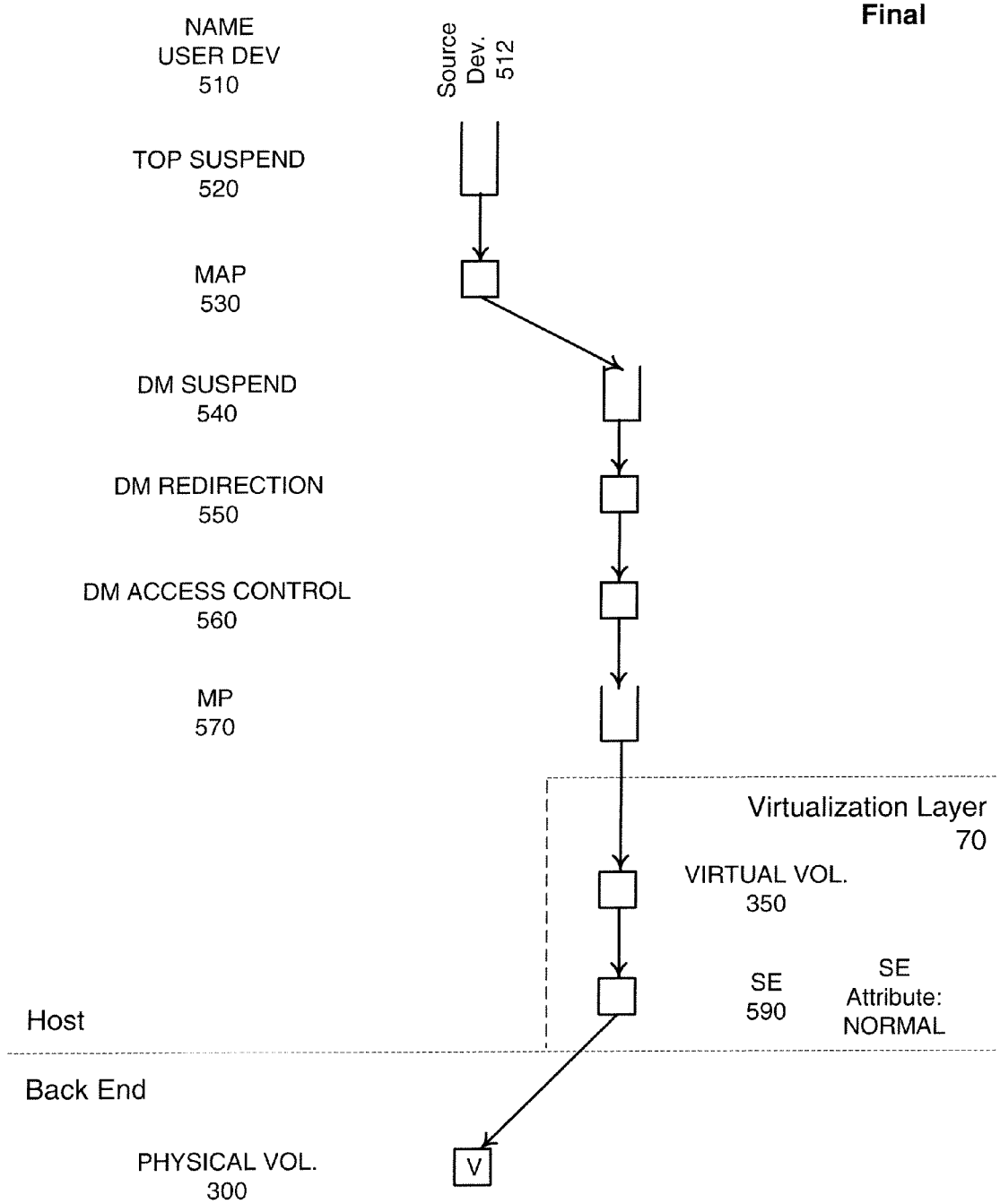
FIG. 10 is a diagram of an exemplary flow of I/O requests during a final state of encapsulation, consistent with an embodiment of the present invention.

FIG. 10 is a flow diagram conceptually illustrating exemplary management of I/O requests at various layers in final state 470 of FIG. 4, consistent with an embodiment of the present invention.

Final state 470 is reached after the user issues a command, such as a CLEANUP command, to transition from committed state 460 to the next state in the encapsulation process. Prior to final state 470 and the completion of the encapsulation process, any physical connection to physical volume 300 at host 1 is eliminated. Any data or metadata from physical volume 300 that might be cached on the host and cause OS or application confusion or errors is removed from the host. Mapping of target user device 516 to the inherent device identifier of physical volume 300 in layer 530 is eliminated. Additionally, mapping in multipath layer 570 directly to physical volume 300 is eliminated. Before final state 470 is reached, but only after the host's direct access to physical volume 300 is removed, access control in level 560 can be disabled.

Figure 11:
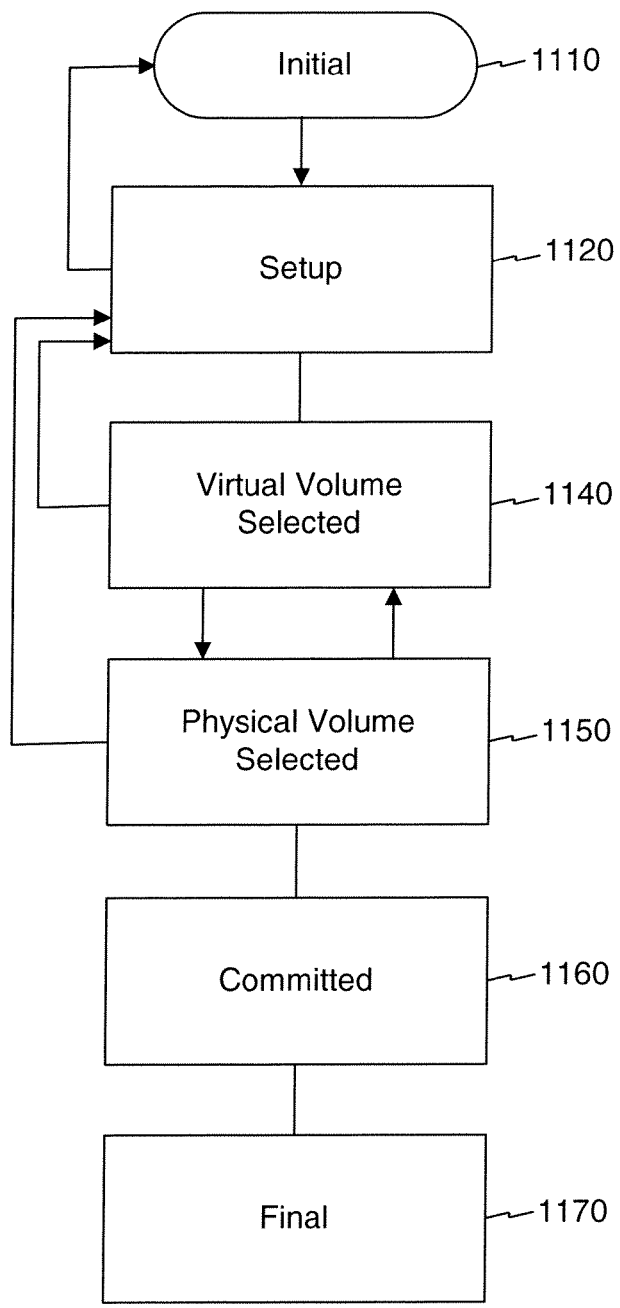
FIG. 11 is diagram of exemplary states in a de-encapsulation process, consistent with an embodiment of the present invention.

FIG. 11 is a diagram 1100 of exemplary states in a process for de-encapsulating a physical volume 300 that is encapsulated with a virtual volume 350, consistent with an embodiment of the present invention. Initial state 1110 of FIG. 11 is a state that exists before the de-encapsulation process has begun. In initial state 1110 of the exemplary embodiment, a host accesses data in the physical volume 300 via the virtual volume 350 with a user device name 512. As shown in FIG. 11, arrows represent possible state transitions that may occur during de-encapsulation. During state 1110, the SE attribute of the SE underlying virtual volume 350 is NORMAL.

Figure 12:
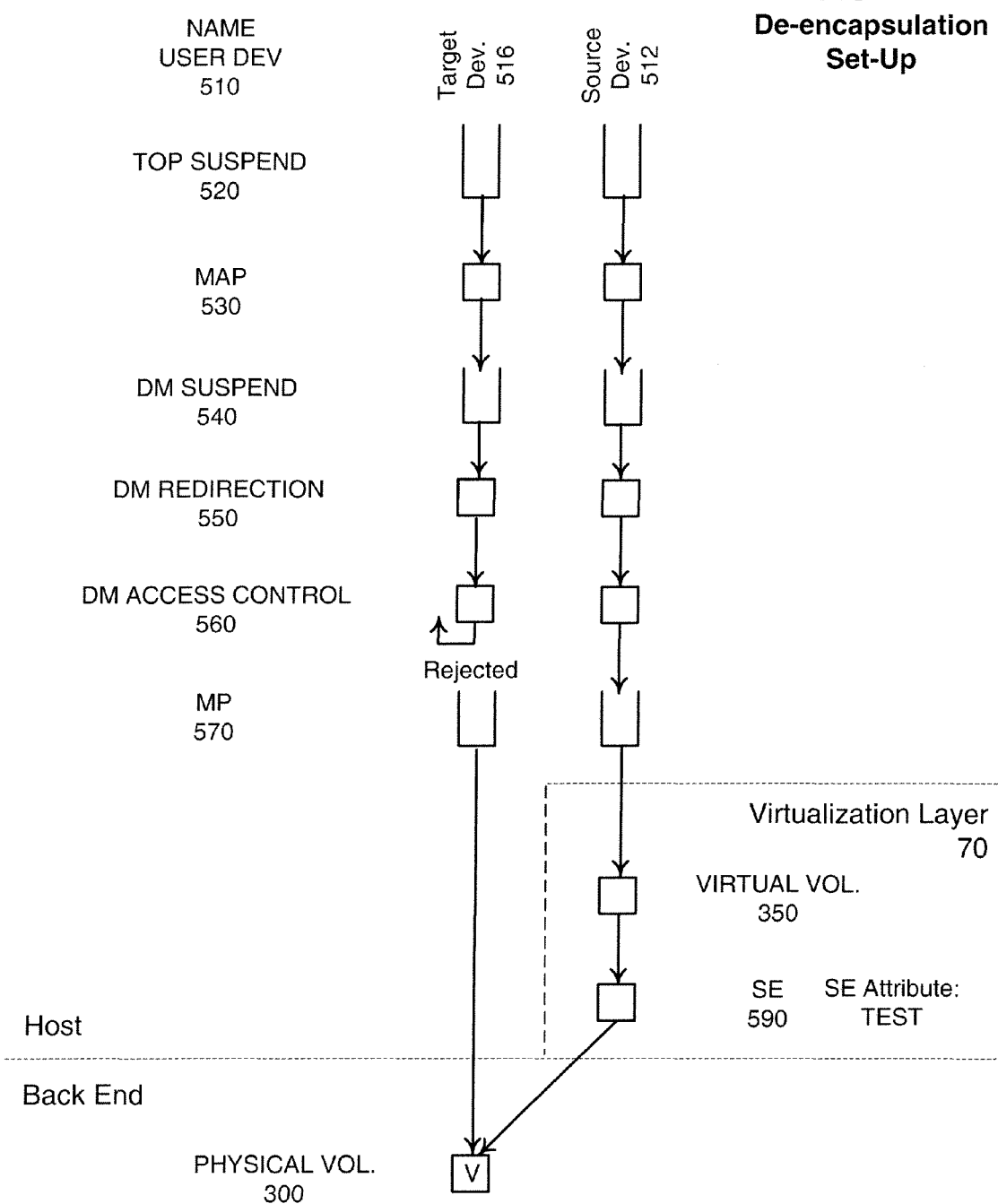
FIG. 12 is diagram of an exemplary flow of I/O requests at the completion of a set up state of de-encapsulation, consistent with an embodiment of the present invention.

Setup state 1120 is reached after a user issues a command, such as the SETUP command, to begin the de-encapsulation process. In the transition from the initial state 1110 to setup state 1120, some preparation required to de-encapsulate the physical volume is done. Prior to setup state 1120, the virtual volume 350 and physical volume 300 are identified. All data to be directly accessed on physical volume 300 at the completion of the de-encapsulation process must reside on that volume by the set-up state 1120. FIG. 12 is a flow diagram conceptually illustrating exemplary management of I/O requests at various layers in set up state 1120 of FIG. 11, consistent with an embodiment of the present invention.

Embodiments of the present invention may include several intermediate phases between initial state 1110 and setup state 1120. In a first phase, the virtual volume may be prepared for de-encapsulation. For example, virtualization layer 70 may simply check that all of the data on virtual volume 350 is on a single physical volume 300. Alternatively, virtualization layer 70 may move all of the data on virtual volume 350 onto a single physical volume 300. After all of the data on virtual volume 350 is on a single physical volume 300, virtualization layer 70 may prevent data on the single physical volume 300 from being moved to another physical volume. This may be done, for example as illustrated in FIG. 12, by setting an attribute associated with storage element 590 in virtualization layer 70 to a TEST state.

In a second phase between initial state 1110 and setup state 1120, information about the physical volume 300 underlying virtual volume 350 may be collected by filter driver 40 from virtualization layer 70. For example, information about the physical volume 300 underlying virtual volume 350 may include information associated with storage element 590 such as its array identifier, its volume identifier, its capacity, and/or its firmware level. Using this information, filter driver 40 may prevent direct access to physical volume 300. This may be done, for example as illustrated in FIG. 12, by setting an attribute in layer 560 that is associated with an identifier of physical volume to a protection value, thereby preventing I/O requests from accessing a physical volume 300. Access control is useful to prevent the host from accessing data both through virtual volume 350 and physical volume 300 directly. If such situation does occur, the host operating system and applications may become confused. Controlling host access to physical volume 300 before direct access to physical volume 300 is even possible may avoid problems in the de-encapsulation process for which no means for avoidance have previously been presented.

In a final phase between initial state 1110 and setup state 1120, physical volume 300 is presented to host computer 1 as target user device 516. FIG. 12 illustrates the completed setup state 1120.

After physical volume 300 is presented to host computer 1 but before virtual volume selected state 1140, filter driver 40 chooses target user device 516 based on identifying information associated with storage element 590.

From setup state 1120, the user has the choice of continuing to a virtual volume selected state 1140, or returning to an initial state 1110, which eliminates the state changes that were made to reach setup state 1120. Additionally, setup state 1120 may also be reached as a result of aborting a de-encapsulation process.

The virtual volume selected state 1140 is reached after a command initiates a transition from the setup state 1120 to the next state in the de-encapsulation process. The TEST state allows I/Os to be issued to the volume from the host, but prevents the prevents virtualization layer 70 from moving data from physical volume 300 to another physical volume. In virtual volume selected state 1140, data in the encapsulated physical volume 300 is accessed via virtual volume 350.

From virtual volume selected state 1140, the user may choose to return to setup state 1120. To continue the de-encapsulation process in virtual volume selected state 1140, however, the user may issue a command to move to a physical volume selected state 1150.

Physical volume selected state 1150 is reached after a command initiates a transition from virtual volume selected state 1140 to the next state in the de-encapsulation process. In physical volume selected state 1150, data in the physical volume may only be accessed directly.

From physical volume selected state 1150, the user may choose to return to virtual volume selected state 1140 or setup state 1120. To continue the de-encapsulation process from physical volume selected state 1150, however, the user may issue a command to move to a committed state 1160. Prior to COMMITTED state 1150, the de-encapsulation process on the host sets the state of the attribute associated with storage element 590 to NOT READY.

Committed state 1160 is reached after a command initiates a transition from physical volume selected state 1150 to the next state in the de-encapsulation process. In committed state 1160, data in the physical volume may no longer be accessed via the virtual volume. Thus, the de-encapsulation process cannot be aborted from committed state 1160. The user may issue the COMMIT command after he is satisfied with an evaluation of direct access to the physical volume.

Final state 1170 in the de-encapsulation process 1100 is reached after a command, such as the CLEANUP command, initiates a transition from committed state 1160 to the next state in the de-encapsulation process. The CLEANUP command verifies that virtual volume 350 is not accessible to host 1. If it is accessible, the CLEANUP command will fail and the de-encapsulation process will remain in the COMMITTED state. Being in the COMMITTED state includes preventing access to virtual volume 350 through the access control mechanism. Prior to final state 1170, storage element 590 in virtualization layer 70 and the associated attributes are eliminated.

The de-encapsulation process states illustrated in FIG. 11 can be related to links conceptually illustrated in FIG. 3A. Prior to the initial state 1110, links 320 and 330 make data on physical volume 300 accessible to host 1, but link 310 does not exist. After the final state 1170, link 310 makes data on physical volume 300 accessible to the host 1 but links 320 and 330 do not exist. In the intermediate states, the links are configured and checked while I/O requests are managed to protect the data on physical volume 300 and minimize the disruption required by the de-encapsulation process. As mentioned with respect to the encapsulation process, the system architecture may alternatively include a direct connection of links 310 and 320 to host 1 and not through SAN 150.

Table 2 summarizes exemplary management of I/O requests in various layers during states in the de-encapsulation process identified in FIG. 11. The first two rows of Table 1 refer to management in host computer 1, which may be implemented in filter driver 40. The last row of Table 1 refers to management in virtualization layer 70.

TABLE 2

Exemplary Management of I/O Requests in Different States in the De-Encapsulation Process

| STATE | Initial | Setup | Virtual Vol. Selected | Physical Vol. Selected | Committed | Final |
|---|---|---|---|---|---|---|
| Redirection | none | none | none | cross (2-way) redirection | none | none |
| Access Control | none | physical vol. | physical vol. | virtual volume | virtual volume | none |
| SE Attribute | Normal | Test | Test | Test | Not Ready | N/A |

The foregoing illustrative embodiments have been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C, C++, HTML, XML, or HTML with included Java applets. One or more of such software sections or modules can be integrated into a computer system.

What is claimed is:

1. A method comprising:
   enabling evaluation of encapsulation of a physical volume by a virtualization layer that presents a virtual volume before committing to the virtual volume, wherein the virtual volume comprises a logical representation of the physical volume, the enabling comprising:
      providing the virtualization layer comprising a SCSI virtualization layer configured to present the virtual volume to a host, a volume virtualization layer configured to generate the virtual volume, and a back-end services layer configured to import the physical volume;
      preventing access to the physical volume through the virtualization layer before presenting the virtual volume to a host; and
      preventing the virtualization layer from moving data on the physical volume before committing to the virtual volume.

2. The method of claim 1 wherein preventing access to the physical volume through the virtual volume comprises setting an attribute in the virtualization layer to a protection value.

3. The method of claim 1 further comprising checking that the virtual volume comprises a one-to-one logical representation of the physical volume.

4. The method of claim 1 further comprising, after committing to the virtual volume, changing an attribute associated with the virtualization layer from a test value to a normal value.

5. The method of claim 1 further comprising, after enabling evaluation of the encapsulation, continuing to prevent direct access to the physical volume until after eliminating a direct presentation to the host of the physical volume.

6. The method of claim 1 wherein the virtualization layer further comprises a switch, metadata storage and a storage processor to control the switch using data in the metadata storage.

7. A method for enabling evaluation of a physical volume used as data storage for a virtualization layer before committing to direct access to the physical volume, wherein the virtualization layer comprises a logical representation of the physical volume, the method comprising:
   providing the virtualization layer further comprising a SCSI virtualization layer configured to present the virtual volume to a host, a volume virtualization layer configured to generate the virtual volume, and a back-end services layer configured to import the physical volume;
   preventing direct access to the physical volume before presenting the physical volume directly to a host; and preventing the virtualization layer from moving data on the physical volume while redirecting to the physical volume a first plurality of I/O requests that were directed to the virtualization layer.

8. The method of claim 7 wherein the virtualization layer further comprises a switch, metadata storage and a storage processor to control the switch using data in the metadata storage.

9. The method of claim 7 wherein preventing direct access to the physical volume comprises setting an attribute in a filter driver associated with an inherent identifier of the physical volume to a protection value.

10. The method of claim 7 further comprising, prior to redirecting the first plurality of I/O requests, checking that a virtual volume comprises a one-to-one logical representation of the physical volume and setting an attribute in the virtualization layer to a test value that prevents the virtualization layer from moving data on the physical volume.

11. The method of claim 7 further comprising resuming access to the physical volume via a virtual volume by:
- terminating the redirection of I/O requests that were directed to the virtual volume and the redirection of I/O requests that were directed to the physical volume;
- enabling I/O requests that were directed to the virtual volume to access the virtual volume; and
- preventing I/O requests that were directed to the physical volume from accessing the physical volume.

* * * * *